(No Model.) 6 Sheets—Sheet 1.

G. M. HOWE.
CASH REGISTER AND INDICATOR.

No. 481,495. Patented Aug. 23, 1892.

(No Model.)  6 Sheets—Sheet 3.

G. M. HOWE.
CASH REGISTER AND INDICATOR.

No. 481,495. Patented Aug. 23, 1892.

WITNESSES:
F. L. Durand
W. L. Coombs

INVENTOR:
George M. Howe,
by Sams Daggy & Co.
Attorneys (No Model.) 6 Sheets—Sheet 4.

G. M. HOWE.
CASH REGISTER AND INDICATOR.

No. 481,495. Patented Aug. 23, 1892.

WITNESSES:
F. L. Ourand
Jo. L. Coombs

INVENTOR:
George M. Howe,
by Sams Bagger & Co.
Attorneys (No Model.) 6 Sheets—Sheet 5.
G. M. HOWE.
CASH REGISTER AND INDICATOR.
No. 481,495. Patented Aug. 23, 1892.
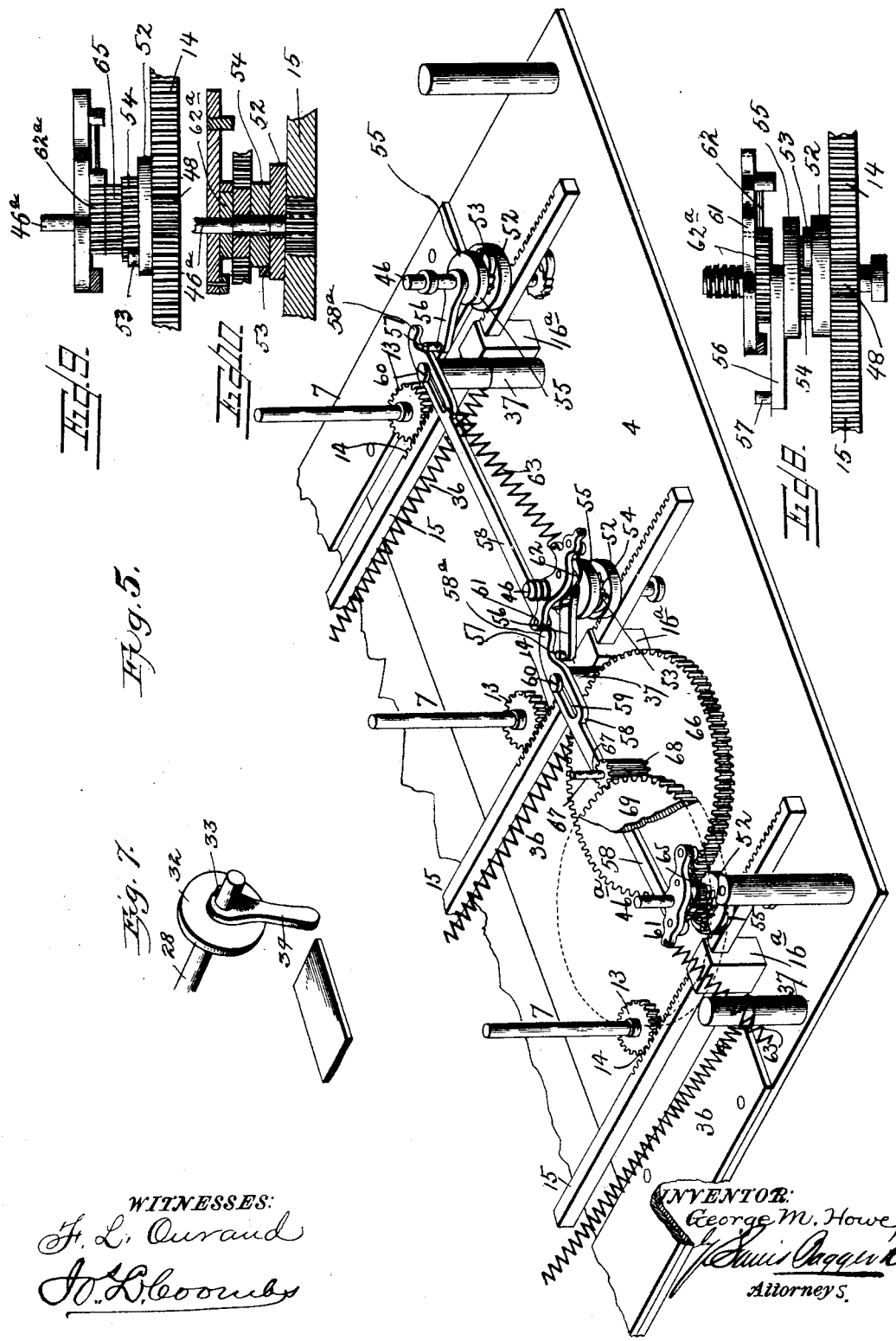
WITNESSES:
F. L. Durand
J. D. Coombs
INVENTOR:
George M. Howe
by Munn Dagger & Co
Attorneys.

(No Model.) 6 Sheets—Sheet 6.
G. M. HOWE.
CASH REGISTER AND INDICATOR.
No. 481,495. Patented Aug. 23, 1892.
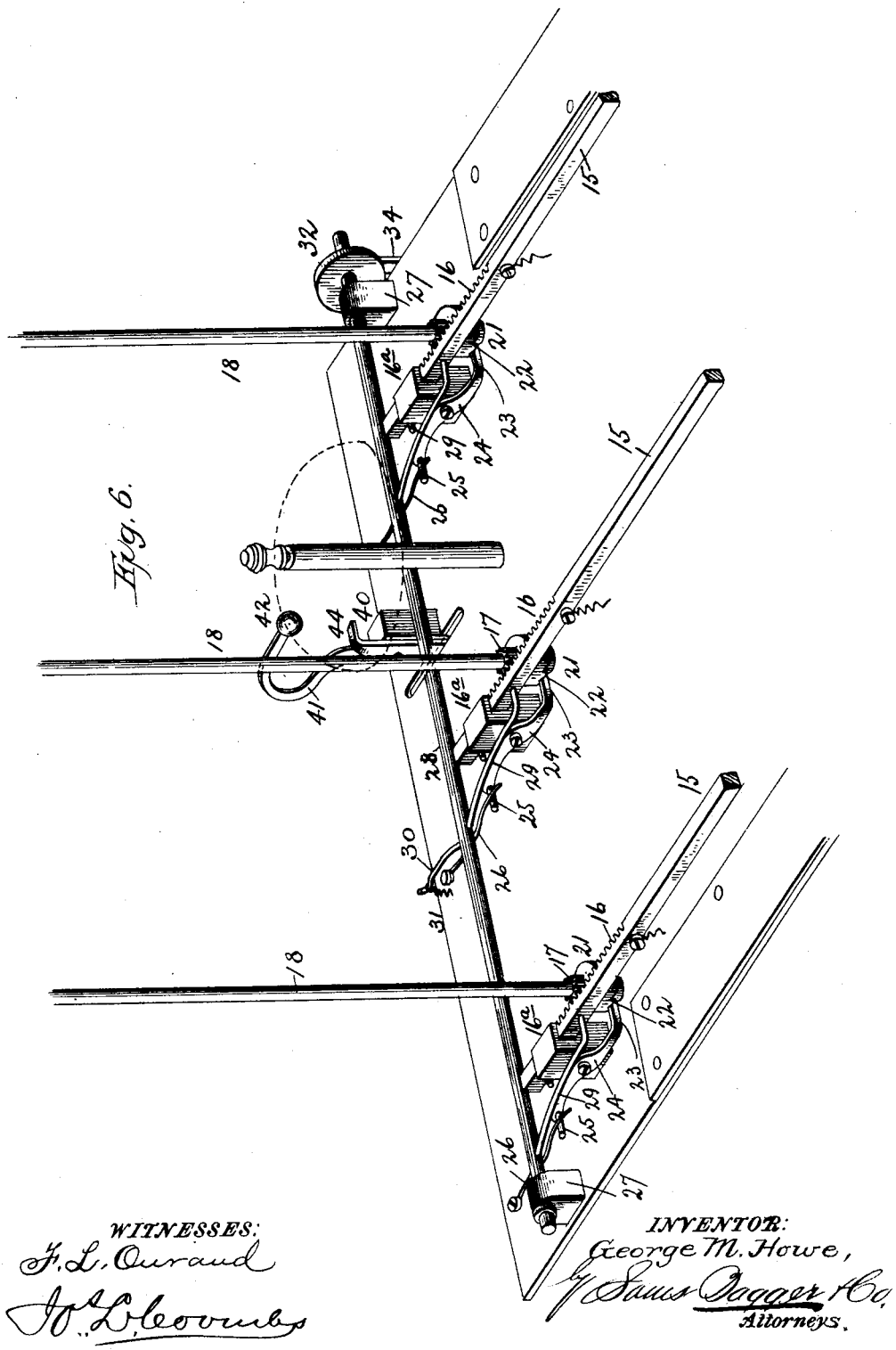
WITNESSES:
F. L. Durand
W. L. Coombs
INVENTOR:
George M. Howe,
Sans Jagger & Co.
Attorneys.

UNITED STATES PATENT OFFICE.

GEORGE M. HOWE, OF FULTON, NEW YORK.

CASH REGISTER AND INDICATOR.

SPECIFICATION forming part of Letters Patent No. 481,495, dated August 23, 1892.

Application filed July 10, 1891. Serial No. 399,035. (No model.)

*To all whom it may concern:*

Be it known that I, GEORGE M. HOWE, a citizen of the United States, and a resident of Fulton, in the county of Oswego and State of New York, have invented certain new and useful Improvements in Cash-Registers; and I do hereby declare that the following is a full, clear, and exact description of the invention, which will enable others skilled in the art to which it appertains to make and use the same, reference being had to the accompanying drawings, which form a part of this specification.

My invention relates to improvements in cash-registers for stores and other places by means of which the cash received for individual sales is displayed or indicated, and the aggregate cash taken in is registered by turning a shaft with a pointer, so that the total amount may be readily ascertained at any time, thus avoiding the necessity of any computing being done by the proprietor or person in charge of the store.

The invention consists in the novel construction and combination of parts, hereinafter fully described, and specifically pointed out in the claims.

Figure 1:
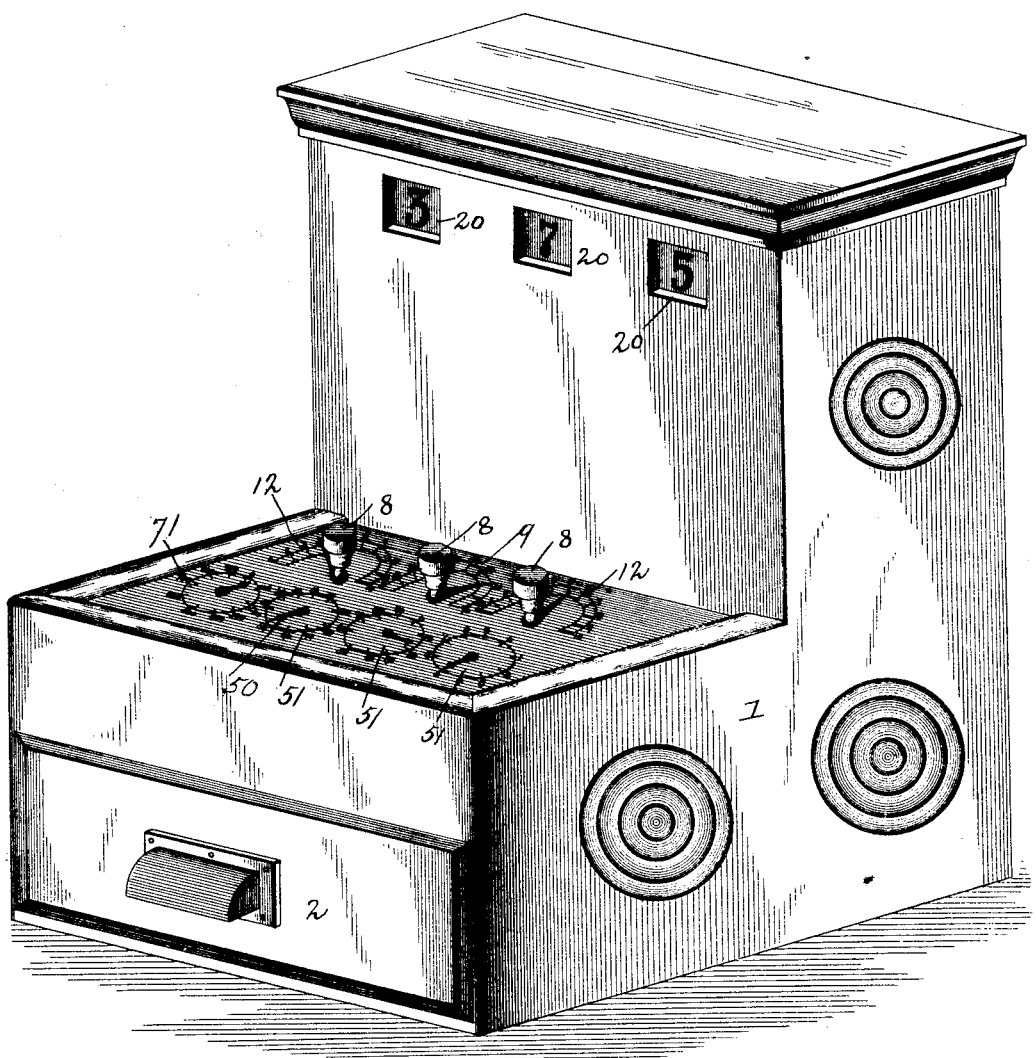
Figure 2:
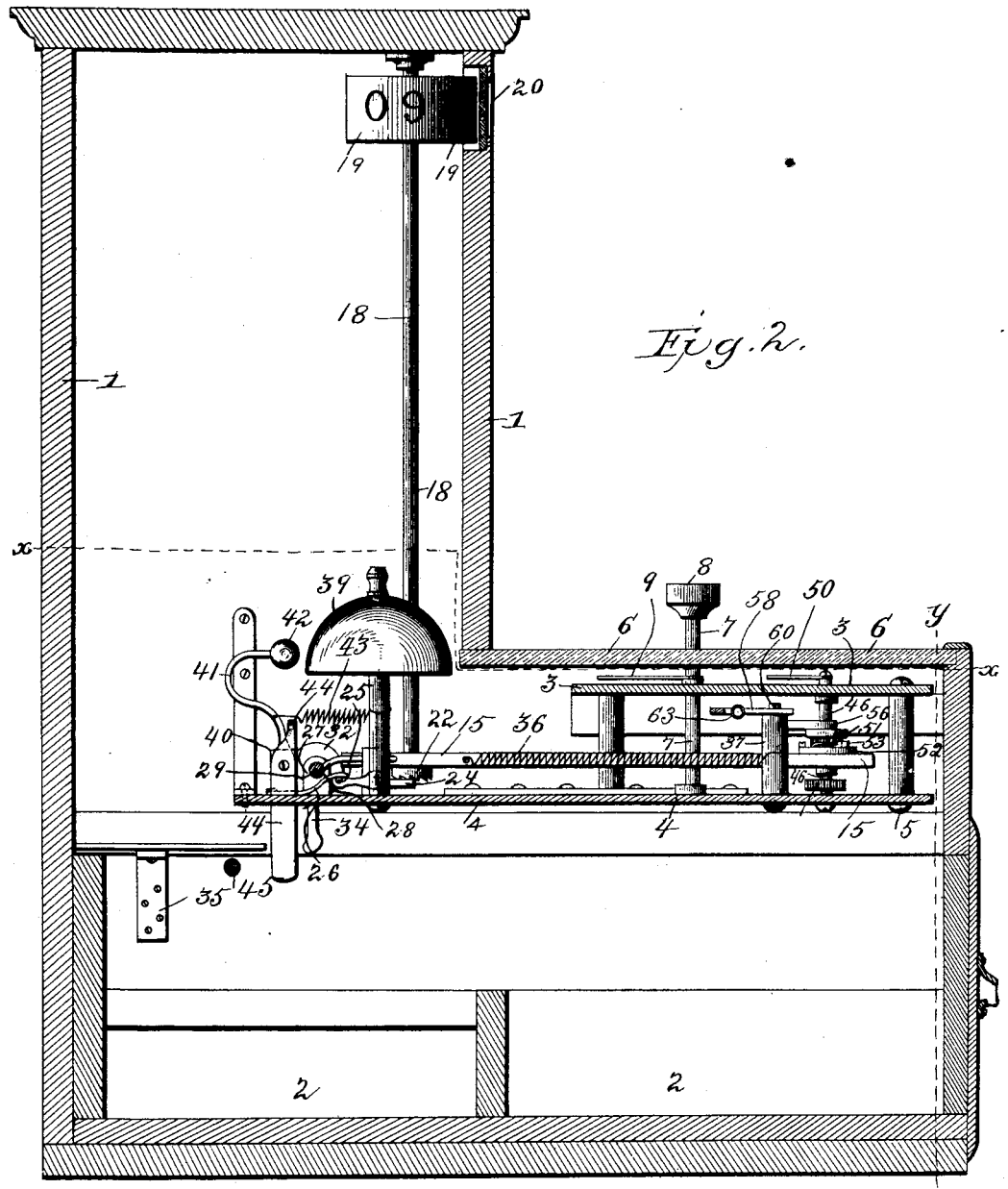
Figure 3:
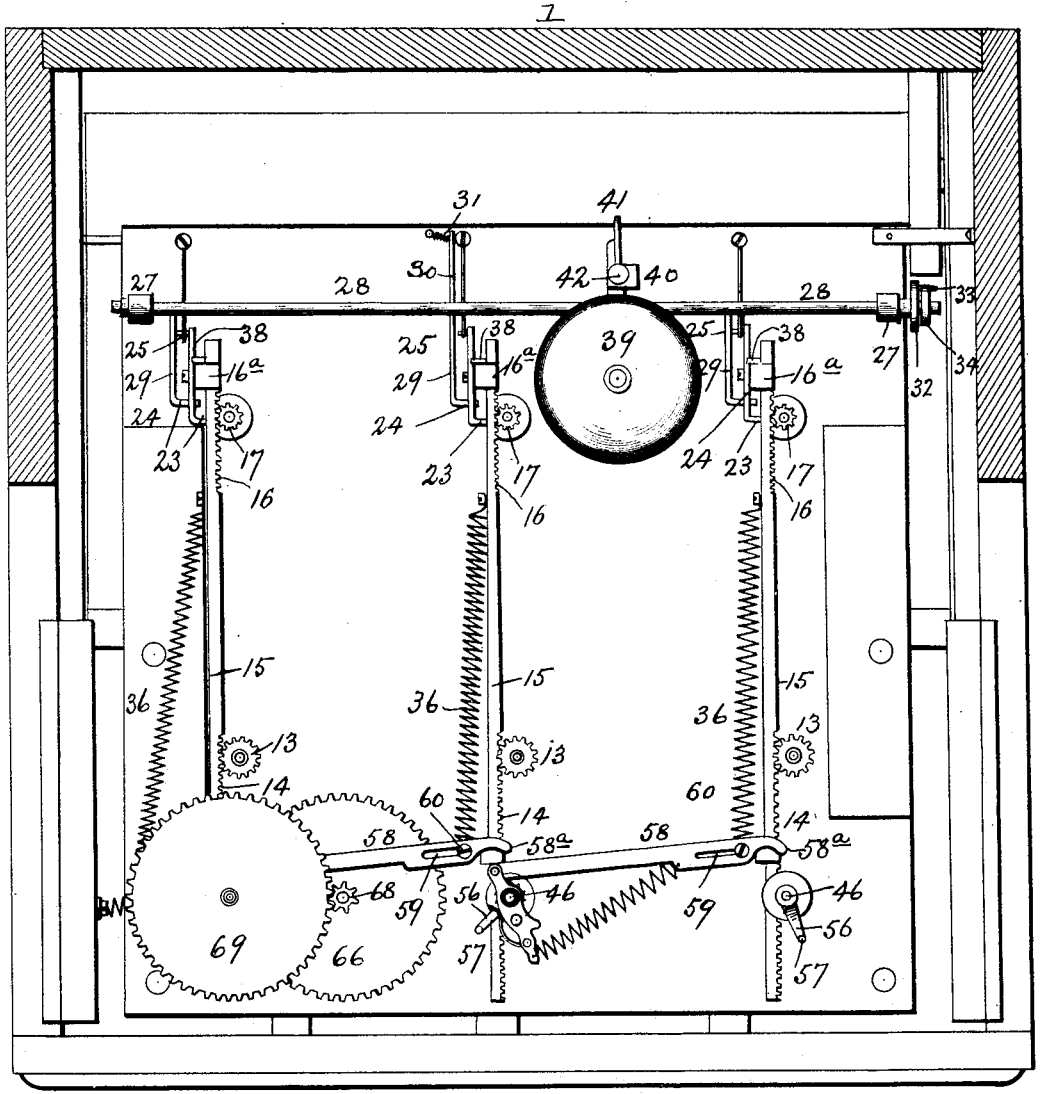
Figure 4:
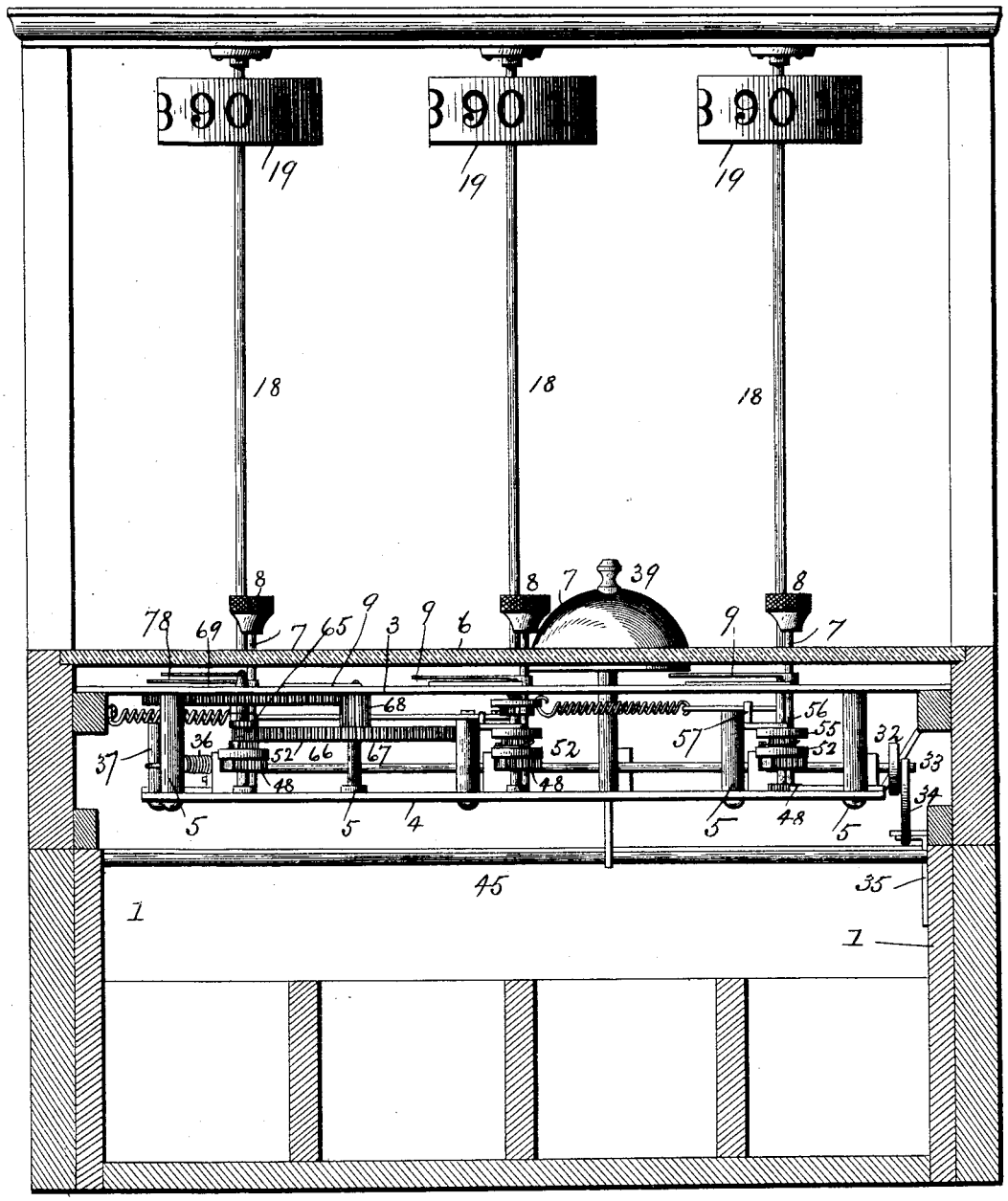

In the accompanying drawings, Figure 1 is a perspective view of a cash-register constructed in accordance with my invention. Fig. 2 is a central longitudinal section of the same. Fig. 3 is a horizontal section on the line $x\,x$, Fig. 2. Fig. 4 is a section on the line $y\,y$, Fig. 2. Figs. 5, 6, and 7 are detail perspective views. Figs. 8 and 9 are detail elevations on an enlarged scale, and Fig. 10 a sectional view of the parts shown in Fig. 9.

In the said drawings, the reference-numeral 1 indicates the casing of the apparatus, comprising a rectangular base portion, which contains the cash-drawer 2 and operating mechanism, and a vertical portion at the rear containing the indicating-wheels and their shafts. Located in the upper portion of said base portion (see Figs. 2 and 4) is a frame consisting of two parallel plates 3 and 4, connected together by means of pillars 5 5. The upper of these plates, marked 3, is provided with a series of dials, hereinafter described, which are covered by means of a plate 6, of glass or other transparent material. Journaled in these plates is a series of vertical shafts 7, the upper ends of which project through the glass plate and are provided with milled heads 8, by which they may be rotated. These shafts, which are for indicating "cents," "dimes," and "dollars," respectively, are provided with pointers or hands 9, which, as the shafts are rotated or turned, point to figures upon the semicircular dials 12. It will be noted that the figures upon the end dials or those used for indicating "cents" and "dollars," respectively, are arranged in regular numerical order from "1" to "9," while the intermediate or dime dial has numbers thereon arranged in consecutive multiples of ten from "10" to "90." (See Fig. 1.) Near their lower ends the shafts 7 (see Figs. 3, 4, and 8) are provided with pinions 13, which engage with rack-teeth 14, formed on bars 15, which are supported by and reciprocate in grooves in short uprights 16ª, secured to the lower plate 4. These bars are provided at their rear ends with similar rack-teeth 16, which engage with pinions 17 upon the vertical shafts 18, journaled in the top of the vertical portion of the casing and in the plate 4. Each of these shafts at its upper end carries a horizontal indicating-wheel 19, having upon its periphery a series of numbers running in regular order from "0" to "9," which numbers are caused to appear at display-openings 20 in the wall of the vertical portion of the casing as said shafts are turned. At their lower ends these shafts are provided with disks 21, having upon their under sides a series of ratchet-teeth 22, with which engage the bent ends 23 of pawls 24, pivoted to the uprights 16ª. At their ends these pawls are provided with projecting studs 25, upon which bear the free ends of springs 26, the other ends of which are secured to the plate 4. These pawls engage with the ratchet-teeth 22 as the shaft is rotated or turned by the rack-bar 15 to indicate the amount of a sale at the display-opening, so as to prevent any backward movement of said shaft and its indicating-wheel.

Journaled in lugs 27, (see Figs. 3, 4, and 8,) secured to plate 4, is a transverse shaft 28, having a series of forwardly-projecting arms 29, having their ends bent at a right angle, so as to engage with the front ends of the pawls 24. The shaft is also provided with a rearwardly-projecting arm 30, which is connected with a coiled spring 31, secured to said plate 4, the tendency of said spring being to keep the arms 29 out of contact with the pawls 24.

Upon one end the shaft 28 is provided with a disk 32, having an outwardly-extending lug or projection 33, which is adapted to engage with a recess upon one side of a lever 34, loosely pivoted to the said shaft, so that by gravity it will occupy a vertical position and lie in the path of a plate 35 at the rear or inner end of the drawer 2, said plate being secured to one of the sides thereof. When the drawer is closed, this plate strikes the lever 34, turning it on the shaft 28 and, engaging with the stud on the fixed disk 32, turns said shaft 28, and by means of the arms and pawls releases the latter from engagement with the ratchet-disks 21 and allows the rack-bar to be returned to normal position by means of coiled spring 36, connected therewith and with upwardly-extending posts 37, secured to plate 4. The bars are also provided with studs or pins 38, which limit the movement thereof by coming in contact with the upright 16.

The numeral 39 designates a bell secured to plate 4. Pivoted to a lug 40, also secured to plate 4, is a hammer-bar 41, provided with a hammer 42. This bar is connected with a coiled spring 43, the other end of which is attached to the bell-post. Also, mounted on the pivot of the hammer-bar is a lever 44, having its upper end bent at right angles, so as to engage with said bar. The lower end of this lever projects downwardly through a slot in the plate 4 and lies in the path of a transverse bar 45, secured to the cash-drawer, so that as the drawer is opened the said bar will strike the lever and, tripping the hammer-bar, will sound an alarm.

Journaled in the plates 3 and 4 and in line with and a short distance in front of the shafts 7 are a series of shafts 46, provided with loose pinions 48, meshing with the rack-teeth 14 on the bars 15. The upper ends of these shafts project through plate 3 and are provided with pointers 50. This plate 3 is also provided with a series of circular dials 51, one for each shaft. These dials are graduated and numbered similar to the dials 12, with the exception that the dollar-dial is provided with one hundred graduations and the numbers are arranged in consecutive multiples of ten from "10" to "90."

Mounted loosely upon the shafts 46 and fixed to the pinions 48, so as to rotate therewith, are disks 52, provided with spring-pawls 53, which engage with ratchet-wheels 54, fixed to said shafts. Connected with or secured to these ratchet-wheels are disks 55, and connected with said disks and shafts are arms 56, having upwardly-projecting studs or pins 57, which are adapted to strike bars 58, having hooked ends 58ᵃ and slots 59, through which pass headed pins or bolts 60 in the ends of the posts 37. The opposite ends of the arms 58 are pivoted to levers 61, mounted upon the next shafts 46 to the left of the apparatus, which levers are provided with spring-pawls 62, which engage with ratchets 62ᵃ on the said shafts. The levers 61 are also provided with coiled springs 63.

When multiplying devices (see Figs. 5, 9, and 10) are employed, the ratchet-wheel 53 is loose on the shaft 46ᵃ at the extreme left of the apparatus and the disk 55 is dispensed with. Connected with the ratchet-wheel 53 is a pinion 65, also loose on said shaft and meshing with a cog-wheel 66, secured to the dollar-shaft 67, carrying a pointer 50, which indicates the dollar sales. Mounted upon this shaft 67 is a pinion 68, meshing with a cog-wheel 69, fast on the shaft 46ᵃ, which shaft is provided with a pointer 71. The arm 65 is operated similar to the arms on the dime and cents shaft 46, and the ratchet-wheel 62ᵃ, which is loose on shaft 46ᵃ, is connected with the pinion 65, fast on said shaft. It is obvious, however, that the multiplying-gear may be dispensed with, if desired, and the dollar-shaft and its connections be constructed and operated similar to the dimes and cents shafts.

The operation will be readily understood. At the beginning of a day's business all the pointers are placed at zero. Supposing now that a sale is made, say, amounting to five dollars and thirty-six cents. The operator turns the dollar-shaft until its pointer points to "5" on its dial. The dime-shaft is then turned until its pointer points to "30," indicating that three dimes or thirty cents have been received, and the cents-shaft is turned so that its pointer will point to "6" on its dial. As these shafts are turned the rack-bars 15 will be moved rearwardly by means of the rack-teeth 14, with which the pinions 13 engage. In their movement toward the rear of the apparatus the bars 15, by means of the rack-teeth 14 engaging with the loose pinions on the shafts 46, will cause said pinions and the disks 52 secured thereto to be turned a distance corresponding with that of the pinions 13. As the pinions 48 and disks 52 rotate, the pawls 53, carried by said disks, will engage with the ratchet-wheels 54 fast to shafts 46, causing said wheels and shafts to be correspondingly rotated and the pointers 50 on said shafts to point to proper figures on the dials 51. At the same time the indicating-shafts 18 will be turned by means of their pinions and the rack-bars so that the wheels thereon will respectively show the figures "5," "3," and "6" at the display-openings, indicating that a sale or sales to the amount of five dollars and thirty-six cents has been made. The bent ends 23 of the pawls 24 will also engage with the ratchet-disks 21 and prevent any backward movement of the shafts 18. The drawer is now opened, when the transverse bar 45 will strike the depending end of the bell-hammer lever, tripping the same and sounding an alarm. The cash is now deposited in the drawer, and the latter pushed in or closed, when the plate 35 will strike the lever 34, elevating the same, which, engaging with the lug 33 on the disk 32 of the transverse shaft 28, will cause the latter to be turned, so that the arms 29 will bear upon the pawls 24, disengaging the bent ends 23 thereof from the ratchet-teeth 22 of the disks 21, allowing the bars 15 to be returned to normal position and returning the pointers 9 to zero. It will be noted that as the ratchet-bars 15 return to normal position after the drawer has been closed the shafts 46 do not resume their former positions, but remain stationary, so that they will indicate the amounts of sales made, for the reason that on the first or rearward movement of the bars 15 the teeth 14 thereon, engaging with the loose pinions 48 on the bars 46, will rotate the same and the disks 52 will cause the pawls 53 to engage with the ratchet-disks 54, fast on the shafts 46, whereby said shafts are correspondingly rotated, while on the return movement of the bars 15 the pinions 48 and disks 52 will be rotated in opposite direction; but the pawls 53 will ride over the ratchets of the wheels 54 without engaging therewith, and consequently without rotating the shafts 46. Supposing, now, that an additional sale of, say, four cents is made, the cents-shaft is turned till it points to the figure "4" and the corresponding shaft 46 will be turned to "10," when the arms 56 will strike the bars 58, which by means of the lever 61 and its pawls 62 will cause the pointer on said dime-shaft 46 to be moved to the next graduation, indicating that a sale amounting to ten cents has been made. A like result will be produced upon the dollar-shaft when the dime-shaft has traveled from "0" to "9."

When a multiplying device is employed, the movement of the rack-bar 14 on the shaft 46ᵃ at the extreme left of the machine will cause pinion 65 to rotate cog-wheel 66 a number of teeth corresponding to the amount of the sale. This will cause pointer 50 on the shaft 67 to indicate such amount on its dial 51. When the said shaft has made a complete revolution, the cog-wheel 69 will have caused the shaft 46ᵃ to make one-tenth of a revolution, so that the pointer 71 will indicate that sales amounting to ten dollars have been made, as will be well understood by those skilled in the art.

From the above it will be seen that each individual sale will be displayed in full view of the customer, while at the same time the aggregate of all the sales made will be registered or indicated upon the dials 51, thereby enabling the proprietor of the store or other establishment to ascertain at a glance the total amounts of the sales made or cash received.

Having thus described my invention, what I claim is—

1. In a cash-register, the combination, with the hand-actuated shafts, their pointers, and the dials, of the rack-bar connected with said shafts, the indicating shafts and wheels, and the display-openings, substantially as described.

2. In a cash-register, the combination, with the hand-actuated shafts, their pinions, and the dials, of the rack-bars, the indicating shafts and wheels, the shafts having pinions meshing with said rack-bars, the shafts having pointers, the connections between said shafts and rack-bars, whereby the former are rotated, substantially as described.

3. In a cash-register, the combination, with the casing, the hand-actuated shafts having pointers adapted to be rotated when a sale is made, and the pinions secured to said shafts, of the rack-bars engaging with said pinions, the indicating-shafts having indicating-wheels thereon, and pinions adapted to engage said bars, the shafts having pointers and pinions, the latter adapted to engage with teeth on said rack-bars, substantially as described.

4. In a cash-register, the combination, with the casing, the hand-actuated shafts provided with pointers, and the dials, of the reciprocating rack-bars, the vertical shafts with indicating or display wheels and pinions engaging with said bars, the ratchet-disks connected with said shafts, the pawls engaging with said ratchet-disks, and means, substantially as described, for disengaging said pawls from the ratchet-disk.

5. In a cash-register, the combination, with the casing, the hand-actuated shafts provided with pointers, and the dials, of the reciprocating rack-bars, the shafts provided with indicating-wheels and pinions adapted to engage with said bars, the ratchet-disks on the lower ends of said bars, and the locking-pawls adapted to engage with said disks, substantially as described.

6. In a cash-register, the combination, with the casing, the hand-actuated shafts provided with pointers, and the dials, of the reciprocating rack-bars, the shafts provided with indicating-wheels and pinions adapted to engage with said rack-bars, the ratchet-disks on the lower ends of said shafts, the pivoted pawls engaging with said disks, and the transverse bar or shaft having arms adapted to engage with said pawls, substantially as described.

7. In a cash-register, the combination, with the casing, the hand-actuated shafts provided with pointers, and the dials, and the reciprocating rack-bars, of the shafts provided with indicating-wheels and pinions adapted to engage with said rack-bars, the ratchet-disks on the lower ends of said shafts, the pivoted spring-pawls engaging with said disks, the transverse shaft having forwardly-projecting arms adapted to engage with said pawls, the disk having a projection or stud fixed to one end of said shaft, the loosely-pivoted gravity-lever, and the cash-drawer having a plate adapted to engage with said lever, substantially as described.

8. In a cash-register, the combination, with the casing, the hand-actuated shafts having pinions and pointers, and the dials, of the reciprocating rack-bars, the shafts in line with said hand-actuated shafts, having pinions engaging with said rack-bars, the pointers on the upper ends of said shafts, and the dials, substantially as described.

9. In a cash-register, the combination, with the casing, the hand-actuated shafts provided with pinions and pointers, and the dials, of the reciprocating rack-bars, the shafts aligned with said hand-shafts, having loose pinions engaging with said rack-bars, the disks having spring-pawls secured to the loose pinions, the ratchet-wheels fixed to the shafts, and the pointers and dials, substantially as described.

10. In a cash-register, the combination, with the casing, the hand-actuated shafts provided with pinions and pointers, and the dials, of the reciprocating rack-bars, the shafts aligned with said hand-shafts, having loose pinions engaging with said rack-bars, the indicator-shafts having indicating-wheels, and pinions engaging with said rack-bars, substantially as described.

11. In a cash-register, the combination, with the casing, the hand-actuated shafts provided with pinions and pointers, the dials, and the reciprocating rack-bars, of the shafts having pointers aligned with said hand-shafts and the dials, the loose pinions on said shafts, the disks fixed to said pinions and provided with spring-pawls, the ratchet-wheels fixed to said shaft, the indicator-shafts having indicating-wheels, and pinions engaging with said rack-bars, substantially as described.

12. In a cash-register, the combination, with the casing, the hand-actuated shafts provided with pinions and pointers, the dials, and the reciprocating rack-bars provided with springs, of the shafts provided with pointers, aligned with said hand-shafts, and the dials, the loose pinions on said shafts, the disks fixed to said pinions and provided with spring-pawls, the ratchet-wheels fixed to said shafts, the indicator-shafts having indicating-wheels, the pinions on said shafts engaging with the rack-bars, the ratchet-disks on the lower ends of said shafts, the pivoted pawls engaging with said ratchets, the transverse shaft having forwardly-projecting arms, the disk fixed to said shaft and having a projection or pin, the loose gravity-lever, and the cash-drawer and plate for tripping said lever, substantially as described.

13. In a cash-register, the combination, with the casing, the hand-actuated shafts provided with pointers and pinions, the dials, and the reciprocating rack-bars, of the shafts having pointers aligned with said hand-shafts, the loose pinions on said shafts, the disks secured to said pinions and provided with spring-pawls, the projecting arms secured to said shafts, the spring-actuated reciprocating bars having hooked ends with which said arms engage, the pivoted pawls to which said bars are connected, and the ratchets on said shafts, with which said pawls engage, substantially as described.

In testimony that I claim the foregoing as my own I have hereunto affixed my signature in presence of two witnesses.

GEORGE M. HOWE.

Witnesses:
DENNIS E. SPENCER,
FRED HOWE.